United States Patent [19]
Bohner et al.

[11] Patent Number: 5,957,026
[45] Date of Patent: Sep. 28, 1999

[54] MOTOR VEHICLE STEERING APPARATUS WITH HYDRAULIC COUPLING

[75] Inventors: Hubert Bohner, Boeblingen; Martin Moser, Fellbach, both of Germany

[73] Assignee: Daimler-Benz AG, Germany

[21] Appl. No.: 08/977,896

[22] Filed: Nov. 25, 1997

[30] Foreign Application Priority Data

Nov. 25, 1996 [DE] Germany .............................. 196 48 737

[51] Int. Cl.⁶ ...................................................... F15B 9/10
[52] U.S. Cl. ........................................... 91/375 R; 92/136
[58] Field of Search .......................... 132/136; 91/375 R, 91/374; 60/403

[56] References Cited

U.S. PATENT DOCUMENTS

| | | |
|---|---|---|
| 1,615,075 | 1/1927 | Francis . |
| 3,566,751 | 3/1971 | Sheppard ................................... 92/136 |
| 3,814,202 | 6/1974 | Rushton et al. ....................... 92/136 X |
| 3,822,759 | 7/1974 | Sheppard ............................... 92/136 X |
| 4,527,465 | 7/1985 | Yoshida et al. ............................ 92/136 |

FOREIGN PATENT DOCUMENTS

| | | |
|---|---|---|
| 39 18 987 A1 | 12/1989 | Germany . |
| 195 46 733 C1 | 3/1997 | Germany . |
| 195 46 942 C1 | 6/1997 | Germany . |
| 196 25 503 C1 | 9/1997 | Germany . |
| 62-15167 | 1/1987 | Japan . |
| 0419829 | 11/1994 | United Kingdom . |
| 2 308 107 | 6/1997 | United Kingdom . |
| 2196090 | 4/1998 | United Kingdom . |

OTHER PUBLICATIONS

United Kingdom Search Rep. Feb. 1998.

*Primary Examiner*—Hoang Nguyen
*Attorney, Agent, or Firm*—Evenson, McKeown, Edwards & Lenahan, P.L.L.C.

[57] ABSTRACT

A motor vehicle steering apparatus contains a user-operated steering angle input system with corresponding steering shaft as well as a piston-and-cylinder unit for coupling a steering angle setting system to the steering angle input system. The hydraulic unit comprises a piston-and-cylinder unit which is disposed with its longitudinal axis running transversely of the steering shaft, and its axially moving piston is coupled mechanically with the rotatory steering shaft and divides the cylinder into two working chambers. The two cylinder halves forming working chambers are disposed on opposite sides of the steering shaft. The piston is configured as a dual piston and is coupled to the steering shaft by a coupling section lying between its ends defining the working chambers. Thereby, a steering apparatus with a compact hydraulic coupling between the steering angle input system and the steering angle setting system is provided, with the ability to rotate the steering angle input system.

5 Claims, 1 Drawing Sheet

MOTOR VEHICLE STEERING APPARATUS WITH HYDRAULIC COUPLING

BACKGROUND AND SUMMARY OF THE INVENTION

This application claims the priority of German application 196 48 737.4, the disclosure of which is expressly incorporated by reference herein.

The present invention relates to a steering apparatus with a user-operated steering angle input system with corresponding steering shaft and with a hydraulic unit for coupling a steering angle setting system to the steering angle input system. The hydraulic unit comprises a piston-and-cylinder unit which is disposed with a long axis running transversely across the steering shaft and whose axially moving piston is coupled mechanically with the rotatory steering shaft and divides the cylinder into two halves each with a working chamber disposed on the opposite side of the steering shaft. The piston is configured as a dual piston and coupled mechanically with the steering shaft by a coupling section situated between its ends defining the working chambers.

DE No. 195 46 942.9 describes a steering apparatus for motor vehicles with a user-operated steering angle input system with corresponding steering shaft and with a hydraulic unit for coupling a steering angle setting system to the steering angle input system. The hydraulic unit comprises a piston-and-cylinder unit which is disposed with the longitudinal shaft running transversely of the steering shaft. An axially moving piston is coupled mechanically with the rotatory steering shaft and divides the cylinder into two halves each with a working chamber. In normal operation, an electrical coupling is active between the steering angle input system and the steering angle setting system. A motor is coupled to the steering shaft and serves to produce a reverse torque. The steering angle setting system contains a hydraulic unit which is operated by a computer unit detecting the steering shaft position and acting upon the steerable wheels of the vehicle. A hydraulic unit serves as a reserve coupling between the steering angle input system and steering angle setting system to increase safety against failure and is active in the event of failure of the electrical coupling. In this known hydraulic unit, the piston-and-cylinder unit is positioned entirely on one side of the steering shaft, and the cylinder is divided by a narrow piston into the two working chambers. The piston is moved by a piston rod which passes frontally through the cylinder from both ends and is coupled at its extremities to return springs which define an equilibrium center position. In its end portion facing the steering shaft, the piston rod is configured as a rack and coupled mechanically to the steering shaft configured as a pinion in a corresponding area. The hydraulic unit so constructed requires in its lengthwise direction a space of at least six times its stroke.

DE application No. 195 46 733.7 discloses a steering apparatus in which, likewise, in addition to an electrical coupling provided for normal operation, a hydraulic unit is provided as a reserve coupling between the steering angle input system and the steering angle setting system. The hydraulic unit comprises a piston-and-cylinder unit with its long axis running parallel to the steering shaft, through both ends of which the steering shaft passes. In the area within the cylinder, the steering shaft is provided with a screw thread which cooperates with an internal thread of a narrow annular piston surrounding the steering shaft to shift it axially. From the working chambers separated from one another in the cylinder by the piston, a rigid hydraulic line runs transversely of the steering shaft. Thus, it is not easily possible to achieve in this steering system the ability of the steering angle input system to turn together with the steering shaft.

A steering apparatus is disclosed in U.S. Pat. No. 1,615,075. The hydraulic unit contains a connecting line for each working chamber running out from the end part of the particular working chamber which is remote from the steering shaft, away from the steering shaft and then with a bend substantially at right angles to the longitudinal axis of the piston-and-cylinder unit it runs to the steering angle setting system configured as an additional piston-and-cylinder unit.

JP 62-15167 (A) discloses, in a steering apparatus for a motor vehicle, the provision of a hydraulic coupling between the steering angle input system and steering angle setting system as a reserve coupling which is active in the event of failure of an additional, electrical coupling between the steering angle input system and the steering angle setting system.

DE 39 18 987 A1 describes a power assisted steering for motor vehicles in which a steering spindle is connected by a rotary sliding valve to an input member of a steering gear, and a working piston of a hydraulic power boosting device can be fed hydraulic fluid by a servo pump through the control valve in the case of a relative rotation of the steering spindle with respect to the input member. The drive shaft of an electric motor is connected with the rotary valve, and the electric motor can be controlled by a signal from a first sensor responding to a relative rotation of the steering spindle with respect to the input member. Thereby, it produces a counter-force on the rotary valve to counter the rotary movement of the steering spindle. The electric motor thus serves for the production of a reverse torque in the case of active hydraulic coupling of the steering. In addition, the electric motor can be made to boost the steering force in case of failure of the hydraulic power boosting system, i.e., to act as a servo motor.

An object of the present invention is to provide a steering apparatus in which the hydraulic unit requires relatively little space and also is secured against failure and/or is constructed such that, if necessary, it easily permits the steering wheel input system to turn with the corresponding steering shaft.

The foregoing object has been achieved in accordance with the present invention by providing a steering apparatus in which each of the two connecting lines runs from an opening thereof out of the corresponding end of the working chamber substantially parallel to the longitudinal axis of the piston-and-cylinder unit into an area proximate the steering shaft or the hydraulic unit serves as a hydraulic reserve coupling between the steering angle input system and the steering angle setting system, which is active in the event of failure of an additional, electrical coupling between the steering angle input system and the steering angle setting system, and an electric motor is coupled with the steering shaft to produce, when the electrical coupling between the steering angle input system and steering angle setting system is active, a reverse torque and, when the hydraulic unit is active, to be operable as a servo motor.

In the steering apparatus of the present invention, the piston-and-cylinder unit is disposed horizontally with its long axis transverse to the steering shaft such that its cylinder extends on both sides of the steering shaft. The piston is mechanically coupled with the steering shaft by a coupling section which lies between the piston ends which define the working chamber. Thereby, there is no end opening in the cylinder for the passage of a piston rod protruding therebeyond, so that the space required transversely of the steering shaft is limited to the cylinder length. This length can be limited to approximately four times the piston stroke required for the maximum steering angle. The position of the piston-and-cylinder unit with its longitudinal axis perpendicular to the steering shaft additionally facilitates the achievement of a desirable ability of the steering wheel input system to pivot as desired together with the corresponding steering shaft.

Furthermore, the compact construction of the hydraulic unit in accordance with the present invention is further facilitated by running the connecting line for each working chamber from the end of the corresponding cylinder half remote from the steering shaft, substantially parallel to the longitudinal axis of the piston-and-cylinder unit, into an area close to the steering shaft, where it compactly continues along the steering shaft and/or can merge with a section of line affixed to the vehicle's body.

In the steering apparatus according to the present invention, the hydraulic unit serves especially as a hydraulic reserve coupling for an electrical coupling active in normal operation between the steering angle input system and the steering angle setting system. An electric motor coupled to the steering shaft is provided which, when the electrical coupling is active, produces a reverse torque on the steering shaft and can function as a servo motor when the hydraulic unit is active. This is important especially when the steering angle setting system comprises a hydraulic unit and the latter fails. In such a case, the wheels can then be acted upon directly by the hydraulic unit coupled to the steering shaft, assisted by the servo motor with hydraulic fluid, in order to set the desired steering angle.

In the improved steering apparatus of the present invention, the steering angle input system is mounted for pivoting together with the steering shaft about an axis perpendicular to the latter. The two connecting lines to the working chambers of the piston-and-cylinder unit are led each to a corresponding rotary connecting element disposed near the steering shaft, which is disposed horizontally in the pivot axis for rotation about the latter. Thus, the hydraulic fluid can be transferred through the rotary connecting elements between, on one hand, the working chambers of the piston-and-cylinder unit and, on the other hand, the steering angle setting system, without the latter being in conflict with the pivoting ability of the steering angle input system.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
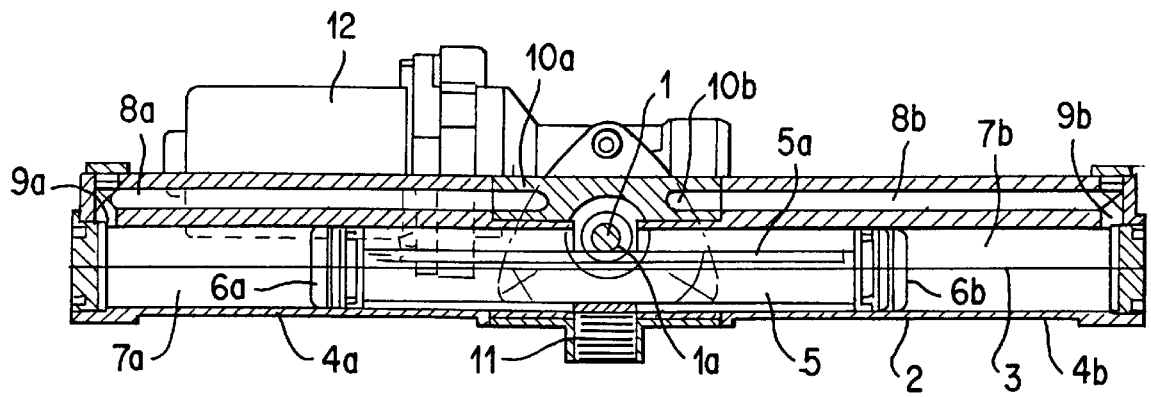
FIG. 1 is a longitudinal, cross-sectional view of a first steering apparatus through a hydraulic unit coupled to a steering shaft.

FIG. 1 shows the part essential to a first steering apparatus according to the present invention. The steering apparatus contains a steering angle input system in the form of a conventional steering wheel with a corresponding steering shaft 1. Furthermore, the steering apparatus contains a hydraulic unit which transmits the steering shaft movement hydraulically to a steering angle setting system. The steering angle setting system is configured in any of the conventional types, for example in one of the forms disclosed in the above-mentioned DE patent applications Nos. 195 46 942.9 and 195 46 733.7.

The hydraulic unit constitutes a hydraulic reserve coupling between the steering angle input system and the steering angle setting system, which is active only when an additionally provided electrical coupling between the steering angle input system and the steering angle setting system fails and, which electrical coupling is active in the normal operation of the steering apparatus. This electrical coupling between the steering angle input system and the steering angle setting system can be brought about in any one of the conventional ways, especially in one of the embodiments described in DE patent application No. 196 25 503.1 with a mechanical reactive torque-producing system.

The characteristically important part of the steering apparatus of FIG. 1 is that part of the illustrated hydraulic unit which is shown in a section taken in a plane perpendicular to the steering shaft 1. The hydraulic unit contains a piston-and-cylinder unit 2 which has its longitudinal axis 3 across the steering shaft 1 and is centered on the steering shaft 1. Two halves, 4a and 4b, of the cylinder extend on opposite sides of the steering shaft 1. The piston is in the form of a rod-like double piston 5 which, with its two ends 6a, 6b, together with the respective cylinder half 4a, 4b, defines working chambers 7a, 7b on opposite sides of the steering shaft 1. In the area between the piston ends, the dual piston 5 is configured as a rack section 5a. With this rack section 5a, the piston 5 is coupled in a direct mechanical manner to the steering shaft 1, the related section of the latter being configured as a matching pinion 1a.

A compression spring 11 provides secure engagement of the rack section 5a of the dual piston with the steering shaft pinion 1a. Rotations of the steering shaft 1, as caused by operating the steering wheel, are in this manner converted to axial movements of the dual piston 5, which in turn cause corresponding flows of the hydraulic fluid used in the hydraulic unit from the one working chamber to the other working chamber. This hydraulic fluid flow is then used in a conventional manner for activating the steering wheel angle setting system, which provides for a corresponding setting of the steering angle at the vehicle's wheels which it controls.

In FIG. 1, the dual piston 5 is shown in its middle position. The distance of each piston face 6a, 6b from the axial end wall of the corresponding cylinder half 4a, 4b in this position of the piston thus corresponds to the stroke of the piston-and-cylinder unit 2 which is necessary for the maximum steering angle to be established. As is also shown in FIG. 1, the space required for the piston-and-cylinder unit 2 in this embodiment is limited substantially to four times the maximum piston stroke measured from the middle position shown.

A connecting line 8a, 8b leads from each working chamber 7a, 7b through corresponding ports 9a, 9b at the end part of the respective cylinder half 4a, 4b which is remote from the steering shaft. Immediately after passing through the cylinder wall through the ports 9a, 9b, the connecting lines 8a, 8b run in a straight line parallel to the longitudinal axis 3 of the piston-and-cylinder unit 2 to an area near the steering shaft in which they pass over at a bend 10a, 10b into a section parallel to the steering shaft 1, from which the hydraulic line then runs on to the steering angle setting system.

As shown in FIG. 1, the two connecting lines 8a, 8b are integral with the piston-and-cylinder unit 2, so that the result is a very compact construction of the hydraulic unit. Leading the connecting lines 8a, 8b to an area near to the steering shaft enhances this compact construction and also makes it possible to provide if necessary for the steering angle input system to be able to rotate together with the corresponding steering shaft 1 without impeding the latter with stiff hydraulic lines remote from the steering shaft. The location of the section of hydraulic line attached to the connecting lines 8a, 8b close to the steering shaft makes it relatively easy for that section to accompany the rotation of the steering shaft and feed into a turn performing element. The latter can, in a conventional manner, be so disposed that, throughout the turning range of the steering angle input system that is mounted for rotation, a definite hydraulic fluid course will be preserved between the piston-and-cylinder unit 2 and the steering angle setting system.

The space-saving hydraulic unit shown in FIG. 1 making possible the turning of the steering angle input system together with steering shaft 1, serves preferably as a redundant reserve coupling between the steering angle input system and the steering angle setting system, which then primarily (i.e., in normal operation) are coupled together by a nonmechanical, preferably electrical coupling. Not until the electrical coupling fails does the hydraulic reserve coupling become active. That is, only then does the hydraulic fluid flow which it produces affect the steering angle setting of the steerable wheels of the vehicle. Otherwise, provision is made by appropriate conventional measures so that the hydraulic fluid flow of the hydraulic unit remains without effect on the steering angle setting system, e.g., by an appropriately controlled bypass whereby the hydraulic fluid can be carried past the steering angle setting system.

As shown schematically in FIG. 1, the steering apparatus contains an electric motor 12 whose shaft is coupled with the steering shaft 1. In the normal operation of the steering apparatus, i.e., when the electrical coupling between the steering angle input system and the steering angle setting system is active, the electric motor 12 serves to produce a suitable restoring torque on the steering shaft 1 and thus on the steering wheel mounted thereon. This conventional measure gives the driver, in this kind of steering apparatus in which the steering angle input system is coupled electrically, not mechanically, to the steering angle setting system, the accustomed steering feel given him by conventional mechanically coupled. steering apparatus.

As an additional characteristic of the steering apparatus of FIG. 1, the electric motor 12 is configured so that it can function, if necessary, also as a servo motor in phases of operation in which the hydraulic unit is active as a reserve coupling between the steering angle input system and steering angle setting system due to failure of electrical coupling. This feature is especially useful if the steering angle setting system contains a hydraulic unit which applies steering force to the steerable wheels of the vehicle but which fails. In this situation, the wheels can then be fed directly with the hydraulic fluid flow produced by the hydraulic unit shown in FIG. 1 in order to set the desired steering angle. The driver is then assisted by the electric motor 12 operating as a servo motor in this case, so that she does not have to apply to the steering wheel by her own strength the force necessary for setting the steering angle of the vehicle's wheels.

Figure 2:
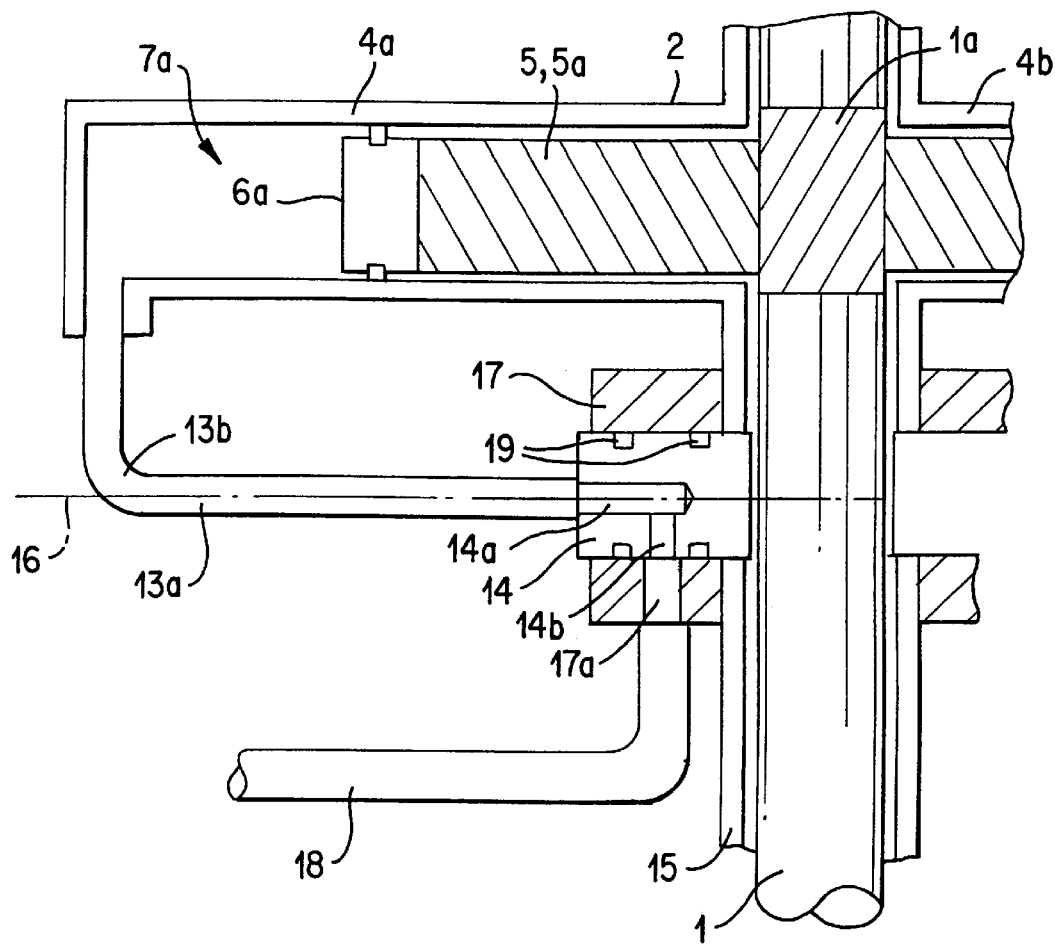
FIG. 2 is a schematic, partial cross-sectional view of a second steering apparatus through a hydraulic unit coupled to a steering shaft.

FIG. 2 shows a second steering apparatus according to the present invention in which this steering apparatus is essentially the same as that of FIG. 1, but only modified as regards the management of the hydraulic fluid lines between the piston-and-cylinder unit 2 coupled to the steering shaft 1 and the steering angle setting system. The same reference numbers are used for functionally equal elements, so that the above description of the same elements in FIG. 1 can be consulted in this regard. In the steering apparatus of FIG. 2, which is shown in a sectional view taken in a plane defined by the steering shaft 1 and the longitudinal axis of the piston-and-cylinder unit 2, only one of the two sides symmetrical with the steering shaft 1 is shown for simplicity.

The connecting line 13a running from the working chamber 7a is formed as a line separate from the piston-and-cylinder unit 2. The connecting line 13a is especially brought out parallel to the steering shaft 1 from the corresponding working chamber 7a to a bend 13b from which it runs perpendicular to the steering shaft 1 to an area close to the steering shaft, where a rotary connecting element is located. The latter contains a block 14 which is co-rotational with a tubular jacket 15 surrounding the steering shaft 1, on which the cylinder halves 4a, 4b of the piston-and-cylinder unit 2 are likewise co-rotationally joined. The steering shaft 1 together with the tubular jacket 15 and the components fixedly joined thereto are mounted for rotation relative to the vehicle's body about an axis 16 running parallel to the longitudinal axis of the piston-and-cylinder unit 2 and perpendicular to the steering shaft 1 in a conventional manner.

The block 14 of the rotary connecting element is carried in a sleeve 17 affixed to the body and is provided with a connecting bore 14a into which the connecting line 13a leads and with a sector-like passage 14b. The sector-like passage 14b extends over an angle including the maximum steering shaft turning angle. Thereby, independently of the momentary position of the steering shaft 1, a fluid connection is established between the bore 14a and a through bore 17a made in the sleeve 17 affixed to the body. From the through bore 17a, a hydraulic line section 18 affixed to the body runs first parallel to the steering shaft 1 and then away from it to the steering angle setting system. For sealing purposes, two axially spaced sealing rings 19 are installed in the rotary coupling element formed by the especially bored block 14, sealing the sector-like passage 14b on both sides.

By arranging the piston-and-cylinder unit 2 transversely of the steering shaft 1 and the connecting lines 13a running along the axis 16 of rotation of the steering angle input system on opposite sides of the steering shaft 1 to a rotary coupling element near the steering shaft, a very compact hydraulic coupling between the steering angle input system and the steering angle setting system is achieved. This coupling structure easily permits, in an especially advantageous manner, that the steering angle input system including the steering shaft can be rotated, as is often desired for modern automobiles, for example.

As should also now be apparent, that the steering apparatus of FIG. 2 can also be equipped with an electric motor corresponding to the example of FIG. 1 to function as a servo motor when an electrical coupling is active between the steering angle input system and the steering angle setting system and a hydraulic reserve coupling is active. The steering apparatus of FIG. 2 offers the characteristics and advantages already mentioned in connection with the above-described embodiment in FIG. 1.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A steering apparatus comprising a user-operated steering angle input system with a rotary steering shaft and a hydraulic unit for coupling a steering angle setting system to the steering angle input system, wherein the hydraulic unit includes a piston-and-cylinder unit having a longitudinal axis running transversely of the steering shaft and an axially moving piston mechanically coupled to the steering shaft and dividing the cylinder into two halves, each with a working chamber disposed on opposite sides of the steering shaft, the piston being configured as a dual piston and having a coupling section lying between ends thereof defining the working chambers and being coupled mechanically with the steering shaft, and the hydraulic unit containing a connecting line for each working chamber which runs from the end part of the working chamber remote from the steering shaft, wherein each of the two connecting lines runs from an opening thereof out of the corresponding end of the working chamber substantially parallel to the longitudinal axis of the piston-and-cylinder unit into an area proximate the steering shaft.

2. A steering apparatus, comprising a user-operated steering angle input system with a rotatable steering shaft and a hydraulic unit for coupling a steering angle setting system to the steering angle input system, wherein the hydraulic unit includes a piston-and-cylinder unit having a longitudinal axis running transversely of the steering shaft and an axially moving piston coupled mechanically to the rotatable steering shaft and dividing the cylinder into two halves, each with a working chamber disposed on opposite sides of the steering shaft, the piston being configured as a dual piston mechanically coupled with the steering shaft by a coupling section between ends thereof defining the working chambers, wherein the hydraulic unit serves as a hydraulic reserve coupling between the steering angle input system and the steering angle setting system, which is active in the event of failure of an additional, electrical coupling between the steering angle input system and the steering angle setting system, and an electric motor is coupled with the steering shaft to produce, when the electrical coupling between the steering angle input system and steering angle setting system is active, a reverse torque and, when the hydraulic unit is active, to be operable as a servo motor.

3. A steering apparatus comprising a user-operated steering angle input system with a rotary steering shaft and a hydraulic unit for coupling a steering angle setting system to the steering angle input system, wherein the hydraulic unit includes a piston-and-cylinder unit having a longitudinal axis running transversely of the steering shaft and an axially moving piston mechanically coupled to the steering shaft and dividing the cylinder into two halves, each with a working chamber disposed on opposite sides of the steering shaft, the piston being configured as a dual piston and having a coupling section lying between ends thereof defining the working chambers and being coupled mechanically with the steering shaft, and the hydraulic unit containing a connecting line for each working chamber which runs from the end Dart of the working chamber remote from the steering shaft, wherein each of the two connecting lines runs from an opening thereof out of the corresponding end of the working chamber substantially parallel to the longitudinal axis of the piston-and-cylinder unit into an area proximate the steering shaft, wherein the steering angle input system is mounted for rotation about an axis lying transversely of the steering shaft and the two connecting lines run each to a rotary coupling element having axis of rotation which coincides with a turning axis of the steering angle input system.

4. The steering apparatus according to claim 2, wherein the steering angle input system is mounted for rotation about an axis lying transversely of the steering shaft and the two connecting lines run each to a rotary coupling element having axis of rotation which coincides with a turning axis of the steering angle input system.

5. The steering apparatus according to claim 1, wherein the connecting lines are integrated within a wall of the piston-and-cylinder unit.

* * * * *